United States Patent
Seo et al.

(10) Patent No.: US 8,824,394 B2
(45) Date of Patent: Sep. 2, 2014

(54) METHOD AND APPARATUS FOR SUPPORTING MULTIPLE CARRIERS

(75) Inventors: Dong Youn Seo, Anyang-si (KR); Min Gyu Kim, Anyang-si (KR); Suck Chel Yang, Anyang-si (KR); Joon Kui Ahn, Anyang-si (KR); Jung Hoon Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 436 days.

(21) Appl. No.: 13/254,682

(22) PCT Filed: Mar. 3, 2010

(86) PCT No.: PCT/KR2010/001326
§ 371 (c)(1),
(2), (4) Date: Nov. 2, 2011

(87) PCT Pub. No.: WO2010/101410
PCT Pub. Date: Sep. 10, 2010

(65) Prior Publication Data
US 2012/0039179 A1 Feb. 16, 2012

Related U.S. Application Data

(60) Provisional application No. 61/157,201, filed on Mar. 3, 2009, provisional application No. 61/250,861, filed on Oct. 12, 2009, provisional application No. 61/253,056, filed on Oct. 19, 2009, provisional application No. 61/258,597, filed on Nov. 6, 2009, provisional application No. 61/290,009, filed on Dec. 24, 2009.

(30) Foreign Application Priority Data

Mar. 2, 2010 (KR) .................. 10-2010-0018596

(51) Int. Cl.
*H04W 4/00* (2009.01)
*H04L 5/00* (2006.01)

(52) U.S. Cl.
CPC ............ *H04L 5/0092* (2013.01); *H04L 5/0053* (2013.01); *H04L 5/001* (2013.01)
USPC ............ 370/329; 370/478; 370/330; 370/344

(58) Field of Classification Search
CPC ..... H04L 5/0092; H04L 1/1864; H04L 5/001; H04L 5/0053; H04L 1/0618
USPC .................................. 370/241, 329, 476, 478
See application file for complete search history.

(56) References Cited

U.S. PATENT DOCUMENTS

| 2003/0016702 A1 | 1/2003 | Bender et al. |
| 2003/0152044 A1 | 8/2003 | Turner |
| 2010/0303011 A1* | 12/2010 | Pan et al. ............ 370/328 |

FOREIGN PATENT DOCUMENTS

KR 10-0695240 B1 3/2007

*Primary Examiner* — Omer S Mian
(74) *Attorney, Agent, or Firm* — Birch, Stewart, Kolasch & Birch, LLP (57) ABSTRACT

A method and apparatus supporting multiple carriers is provided. A user equipment receives a self-control format indicator (CFI) indicating a size of a control region of a first carrier by using the first carrier. The user equipment receives downlink control information (DCI) comprising a cross-CFI indicating a size of a control region of a second carrier over a first downlink control channel in the control region of the first carrier. The user equipment monitors a second downlink control channel in the control region of the second carrier.

8 Claims, 11 Drawing Sheets

Fig. 15 understood# METHOD AND APPARATUS FOR SUPPORTING MULTIPLE CARRIERS

CROSS REFERENCE TO RELATED APPLICATIONS

This application is the National Phase of PCT/KR2010/001326 filed on Mar. 3, 2010, which claims the benefit under 35 U.S.C. 119(e) of U.S. Provisional Application Nos. 61/157,201, 61/250,861, 61/253,056, 61/258,597, 61/290,009, filed on Mar. 3, 2009, Oct. 12, 2009, Oct. 19, 2009, Nov. 6, 2009, Dec. 24, 2009 respectively, and under 35 U.S.C. 119(a) to Patent Application No. KR 10-2010-0018596 filed in the Republic of Korea on Mar. 2, 2010, all of which are hereby expressly incorporated by reference into the present application.

TECHNICAL FIELD

The present invention relates to wireless communications, and more particularly, to a method and apparatus for supporting multiple carriers in a wireless communication system.

BACKGROUND ART

Wireless communication systems are widely spread all over the world to provide various types of communication services such as voice or data. In general, the wireless communication system is a multiple access system capable of supporting communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

Even if a bandwidth is set differently between an uplink and a downlink, only one carrier is generally considered in the conventional wireless communication system. The carrier is defined with a center frequency and a bandwidth. A multiple carrier system uses a plurality of carriers having a narrower bandwidth than a full bandwidth.

Long term evolution (LTE) based on 3rd generation partnership project (3GPP) technical specification (TS) release 8 is a promising next-generation mobile communication standard.

As disclosed in 3GPP TS 36.211 V8.5.0 (2008-12) "Evolved Universal Terrestrial Radio Access (E-UTRA); Physical Channels and Modulation (Release 8)", a physical channel of the LTE can be classified into a data channel, i.e., a physical downlink shared channel (PDSCH) and a physical uplink shared channel (PUSCH), and a control channel, i.e., a physical downlink control channel (PDCCH), a physical control format indicator channel (PCFICH), a physical hybrid-ARQ indicator channel (PHICH), and a physical uplink control channel (PUCCH).

A 3GPP LTE system supports only one bandwidth (i.e., one carrier) among {1.4, 3, 5, 10, 15, 20} MHz. The multiple carrier system uses two carriers having a bandwidth of 20 MHz to support a full bandwidth of 40 MHz, or uses three carriers respectively having bandwidths of 20 MHz, 15 MHz, and 5 MHz.

The multiple carrier system can support backward compatibility with a legacy system, and can significantly increase a data rate by using multiple carriers.

In a single carrier system, a control channel and a data channel are designed based on a single carrier. Therefore, it may be ineffective if a channel structure of the single carrier system is directly used in the multiple carrier system.

If an error occurs in a control channel when performing hybrid automatic repeat request (HARQ), HARQ buffer management may be adversely affected significantly. To avoid an HARQ buffer corruption, the control channel is generally designed in an error robust manner.

More reliable control channel transmission is necessary in the multiple carrier system which has to consider cross-carrier scheduling capable of performing scheduling between different carriers. This is because an error rate may be further increased due to a different channel state when the control channel and the data channel are transmitted using the different carriers.

Accordingly, there is a need for a technique capable of supporting the multiple carrier system.

DISCLOSURE OF INVENTION

Technical Problem

The present invention provides a method and apparatus for supporting multiple carriers.

The present invention also provides a method and apparatus for monitoring a control channel in a multiple carrier system.

Solution to Problem

In an aspect, a method of monitoring a control channel in a multiple carrier system is provided. The method includes receiving a self-control format indicator (CFI) indicating a size of a control region of a first carrier by using the first carrier, receiving downlink control information (DCI) comprising a cross-CFI indicating a size of a control region of a second carrier over a first downlink control channel in the control region of the first carrier, and monitoring a second downlink control channel in the control region of the second carrier.

The DCI may include a plurality of cross-CFIs for a plurality of carriers.

The DCI may further include a carrier indicator (CI) indicating an index of the second carrier.

The method may further include receiving from a base station whether the self-CFI is received.

In another aspect, a user equipment supporting multiple carriers includes a radio frequency (RF) unit for transmitting and receiving a radio signal, and a processor coupled to the RF unit, wherein the processor is configured to receive a self-control format indicator (CFI) indicating a size of a control region of a first carrier by using the first carrier, receive downlink control information (DCI) comprising a cross-CFI indicating a size of a control region of a second carrier over a first downlink control channel in the control region of the first carrier, and monitor a second downlink control channel in the control region of the second carrier.

Advantageous Effects of Invention

A technique for obtaining a control format indicator (CFI) in a multiple carrier system is proposed. Error in control channels can be reduced, and a hybrid automatic repeat request (HARQ) buffer corruption can be prevented.

MODE FOR THE INVENTION

Figure 1:
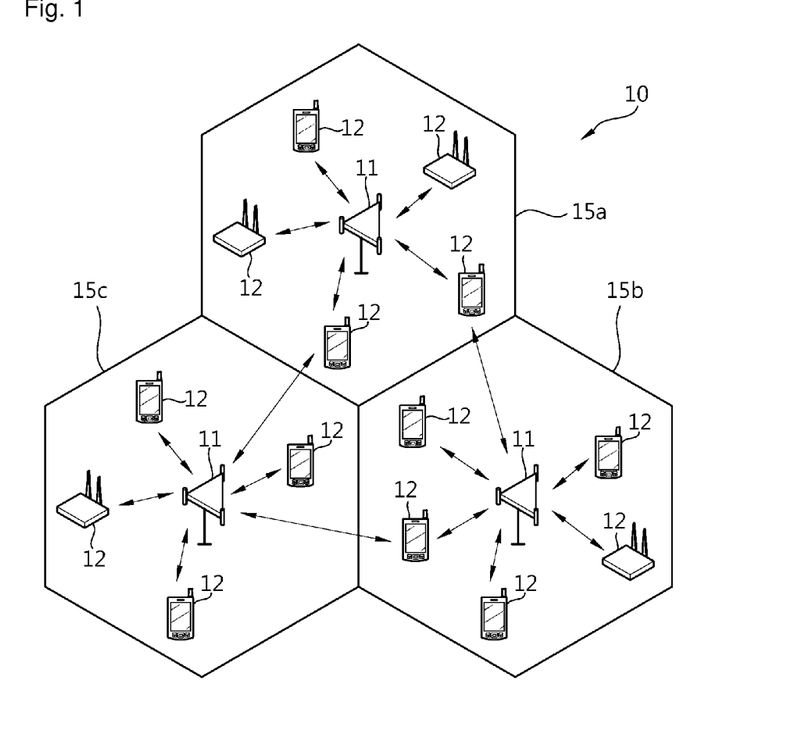
FIG. 1 shows a wireless communication system.

FIG. 1 shows a wireless communication system. A wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors).

A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

The BS 11 is generally a fixed station that communicates with the UE 12 and may be referred to as another terminology, such as an evolved node-B (eNB), a base transceiver system (BTS), an access point, etc.

Hereinafter, downlink implies communication from the BS to the UE, and uplink implies communication from the UE to the BS. In the downlink, a transmitter may be a part of the BS, and a receiver may be a part of the UE. In the uplink, the transmitter may be a part of the UE, and the receiver may be a part of the BS.

Figure 2:
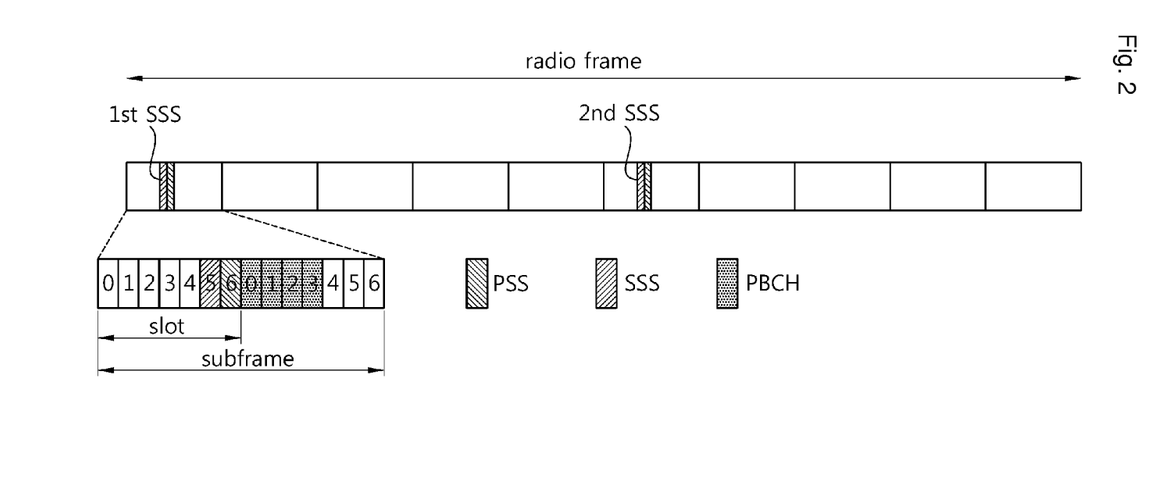
FIG. 2 shows a radio frame structure in 3rd generation partnership project (3GPP) long term evolution (LTE).

FIG. 2 shows a radio frame structure in 3rd generation partnership project (3GPP) long term evolution (LTE). The section 6 of 3GPP TS 36.211 V8.5.0 (2008-12) "Evolved Universal Terrestrial Radio Access (E-UTRA); Physical Channels and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-12), in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and an RB includes 12 subcarriers in a frequency domain, one RB can include 7×12 resource elements (REs).

A primary synchronization signal (PSS) is transmitted in last OFDM symbols of a 1st slot, i.e., a 1st slot of a 1st subframe (a subframe indexed with 0), and an 11th slot, i.e., a 1st slot of a 6th subframe (a subframe indexed with 5). The PSS is used to obtain OFDM symbol synchronization or slot synchronization, and is in association with a physical cell identify (ID). A primary synchronization code (PSC) is a sequence used for the PSS. There are three PSCs in the 3GPP LTE. One of the three PSCs is transmitted using the PSS according to a cell ID. The same PSC is used for each of the last OFDM symbols of the 1st slot and the 11th slot.

A secondary synchronization signal (SSS) includes a 1st SSS and a 2nd SSS. The 1st SSS and the 2nd SSS are transmitted in an OFDM symbol adjacent to an OFDM symbol in which the PSS is transmitted. The SSS is used to obtain frame synchronization. The SSS is used to obtain a cell ID together with the PSS. The 1st SSS and the 2nd SSS use different secondary synchronization codes (SSCs). If the 1st SSS and the 2nd SSS each include 31 subcarriers, sequences of two SSCs with a length of 31 are respectively used for the 1st SSS and the 2nd SSS.

A physical broadcast channel (PBCH) is transmitted in four preceding OFDM symbols of a 2nd slot of the 1st subframe. The PBCH carries necessary system information required by a UE to communicate with a BS. System information transmitted through the PBCH is referred to as a master information block (MIB). In comparison thereto, system information transmitted through a physical downlink control channel (PDCCH) is referred to as a system information block (SIB).

As disclosed in 3GPP TS 36.211 V8.5.0 (2008-12), the LTE classifies a physical channel into a data channel, i.e., a physical downlink shared channel (PDSCH) and a physical uplink shared channel (PUSCH), and a control channel, i.e., a physical downlink control channel (PDCCH) and a physical uplink control channel (PUCCH). Further, there is a downlink control channel, i.e., a physical control format indicator channel (PCFICH) and a physical hybrid-ARQ indicator channel (PHICH).

Figure 3:
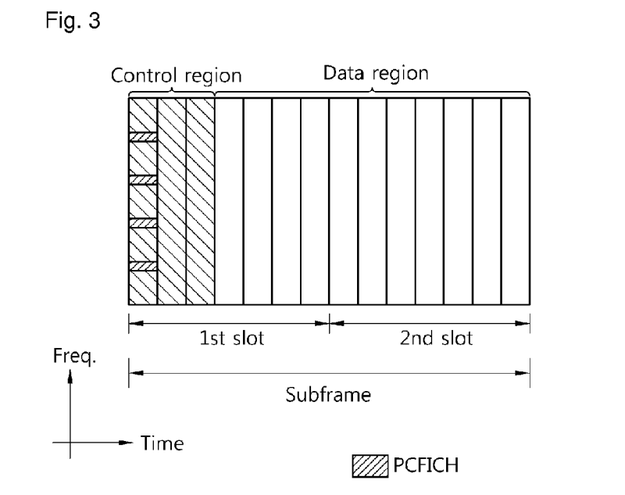
FIG. 3 shows a downlink subframe structure in 3GPP LTE.

FIG. 3 shows a downlink subframe structure in 3GPP LTE. A subframe is divided into a control region and a data region in a time domain. The control region includes up to three preceding OFDM symbols of a 1st slot in the subframe. The number of OFDM symbols included in the control region may vary. A PDCCH is allocated to the control region, and a PDSCH is allocated to the data region.

Control information transmitted through the PDCCH is referred to as downlink control information (DCI). The DCI may include resource allocation of the PDSCH (this is referred to as a downlink grant), resource allocation of a PUSCH (this is referred to as an uplink grant), a set of transmit power control commands for individual UEs in any UE group and/or activation of a voice over Internet protocol (VoIP).

A PCFICH transmitted in a 1st OFDM symbol in the subframe carries information regarding the number of OFDM symbols (i.e., a size of the control region) used for transmission of control channels in the subframe.

A PHICH carries an acknowledgement (ACK)/not-acknowledgement (NACK) signal for uplink hybrid automatic repeat request (HARQ). That is, the ACK/NACK signal for uplink data transmitted by the UE is transmitted over the PHICH.

Figure 4:
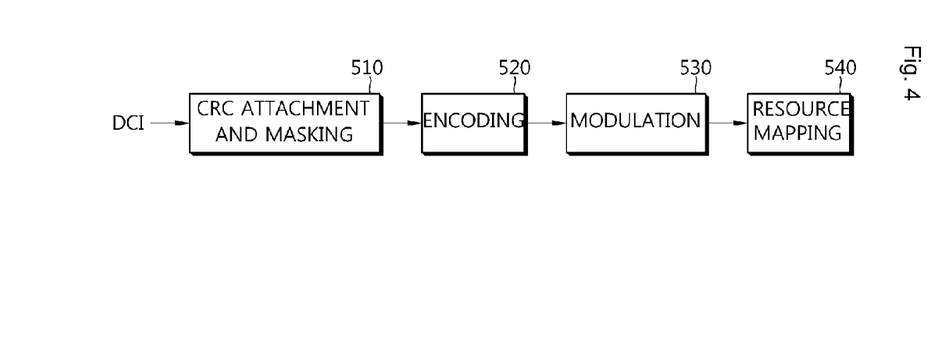
FIG. 4 is a block diagram showing a structure of a physical downlink control channel (PDCCH).

FIG. 4 is a block diagram showing a structure of a PDCCH. A BS determines a PDCCH format according to DCI to be transmitted to a UE. Thereafter, the BS attaches a cyclic redundancy check (CRC) to the DCI, and masks a unique identifier (referred to as a radio network temporary identifier (RNTI)) to the CRC according to an owner or usage of the PDCCH (block 510).

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

When the C-RNTI is used, the PDCCH carries control information for a specific UE (this is referred to as UE-specific control information), and when other RNTIs are used, the PDCCH carries common control information received by all or a plurality of UEs in a cell.

The CRC-attached DCI is encoded to generate coded data (block 520). Encoding includes channel encoding and rate matching.

The coded data is modulated to generate modulation symbols (block 530).

The modulation symbols are mapped to physical resource elements (REs) (block 540). The modulation symbols are respectively mapped to the REs.

Figure 5:
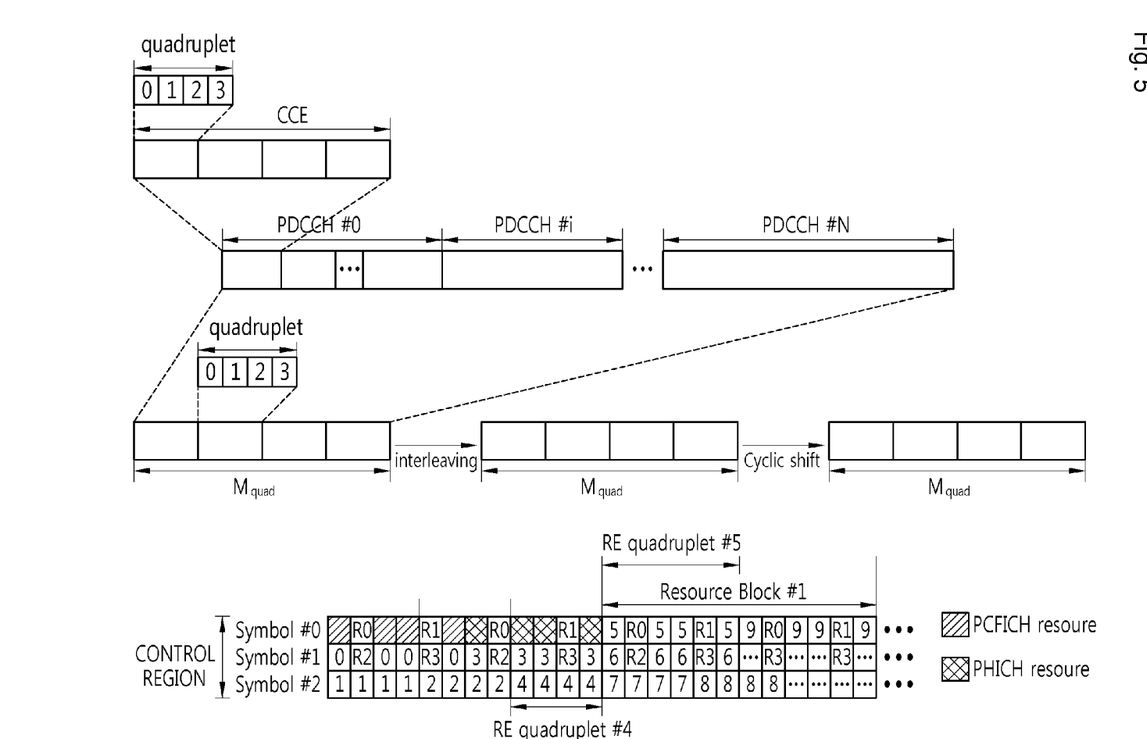
FIG. 5 shows exemplary resource mapping of a PDCCH.

FIG. 5 shows exemplary resource mapping of a PDCCH. The section 6 of 3GPP TS 36.211 V8.5.0 (2008-12) may be incorporated herein by reference. R0 denotes a reference signal of a 1st antenna, R1 denotes a reference signal of a 2nd antenna, R2 denotes a reference signal of a 3rd antenna, and R3 denotes a reference signal of a 4th antenna.

A control region in a subframe includes a plurality of control channel elements (CCEs). The CCE is a logical allocation unit used to provide the PDCCH with a coding rate depending on a radio channel state, and corresponds to a plurality of resource element groups (REGs). According to an association relation of the number of CCEs and the coding rate provided by the CCEs, a PDCCH format and a possible number of bits of the PDCCH are determined.

One REG (indicated by a quadruple in FIG. 5) includes 4 REs. One CCE includes 9 REGs. The number of CCEs used to configure one PDCCH may be selected from a set $\{1, 2, 4, 8\}$. Each element of the set $\{1, 2, 4, 8\}$ is referred to as a CCE aggregation level.

A control channel consisting of one or more CCEs performs interleaving in an REG unit, and is mapped to a physical resource after performing cyclic shift based on a cell identifier (ID).

The 3GPP LTE uses blind decoding for PDCCH detection. In the blind decoding, a specific identifier is de-masked from a CRC of a PDCCH (referred to as a candidate PDCCH), and then CRC error checking is performed to determine whether the PDCCH is a control channel of an entity performing the blind decoding.

A plurality of PDCCHs can be transmitted in one subframe. A UE monitors a plurality of PDCCHs in every subframe. Monitoring is an operation of attempting PDCCH decoding by the UE according to a format of the monitored PDCCH.

The 3GPP LTE uses a search space to reduce an overload caused by blind decoding. The search space is classified into a common search space and a UE-specific search space. The common search space is a space for searching for a PDCCH having common control information and consists of 16 CCEs indexed with 0 to 15. The common search space supports a PDCCH having a CCE aggregation level of $\{4, 8\}$. The UE-specific search space supports a PDCCH having a CCE aggregation level of $\{1, 2, 4, 8\}$.

Information transmitted through a PCFICH is referred to as a control format indicator (CFI). The CFI includes the number of OFDM symbols (i.e., a size of a control region) used for transmission of control channels. The CFI is information that must be known to the UE before monitoring the PDCCH. Therefore, the UE first receives the CFI over the PCFICH, and thereafter monitors the PDCCH.

Unlike the PDCCH, the PCFICH is transmitted using a fixed PCFICH resource of a subframe without using blind decoding.

Now, a multiple carrier system will be described.

The 3GPP LTE system supports a case where a downlink bandwidth and an uplink bandwidth are set differently under the premise that one component carrier is used. This implies that the 3GPP LTE is supported only for a case where the downlink bandwidth and the uplink bandwidth are equal to or different from each other in a situation where one component carrier is defined for each of a downlink and an uplink. For example, the 3GPP LTE may support up to 20 MHz, and supports only one component carrier for the uplink and the downlink even if the uplink bandwidth and the downlink bandwidth may be different from each other.

Spectrum aggregation (also referred to as bandwidth aggregation or carrier aggregation) is for supporting a plurality of component carriers. The spectrum aggregation is introduced to support an increasing throughput, to prevent cost rising caused by introduction of a broadband radio frequency (RF) device, and to ensure compatibility with a legacy system. For example, when 5 component carriers are assigned with a granularity of a carrier unit having a bandwidth of 20 MHz, a bandwidth of up to 100 MHz can be supported.

The spectrum aggregation can be classified into contiguous spectrum aggregation achieved between consecutive carriers in a frequency domain and non-contiguous spectrum aggregation achieved between discontinuous carriers. The number of carriers aggregated in a downlink may be different from the number of carriers aggregated in an uplink. Symmetric aggregation is achieved when the number of downlink carriers is equal to the number of uplink carriers. Asymmetric aggregation is achieved when the number of downlink carriers is different from the number of uplink carriers.

Component carriers may have different sizes (i.e., bandwidths). For example, when 5 component carriers are used to configure a band of 70 MHz, the band can be configured as 5 MHz carrier (carrier #0)+20 MHz carrier (carrier #1)+20 MHz carrier (carrier #2)+20 MHz carrier (carrier #3)+5 MHz carrier (carrier #4).

Hereinafter, a multiple carrier system implies a system supporting multiple carriers on the basis of spectrum aggregation. The multiple carrier system can use contiguous spectrum aggregation and/or non-contiguous spectrum aggregation, and also can use either symmetric aggregation or asymmetric aggregation.

For clarity, three component carriers (CCs), i.e., a CC #1, a CC #2, and a CC #3, will be considered in the following description. However, the number of CCs is not limited thereto.

Cross-carrier scheduling is possible between multiple carriers. That is, a PDSCH of the CC #2 may be indicated using a downlink grant (or an uplink grant) of a PDCCH of the CC #1. A carrier on which the PDCCH is transmitted is referred to as a reference carrier or a primary carrier. A carrier on which a PDSCH is transmitted is referred to a secondary carrier.

The CC #1 will be hereinafter referred to as a reference carrier, and there is no restriction on the number of reference carriers or the deployment of reference carriers.

A CFI of the reference carrier is referred to as a self-CFI. A CFI of another carrier is referred to as a cross-CFI. For the self-CFI, a CC on which the CFI is obtained (or transmitted) is equal to a CC for which the CFI is used. For the cross-CFI, a CC on which the CFI is obtained (or transmitted) is different from a CC for which the CFI is used. That is, when a UE operates in the CC #2, a CFI directly obtained from the CC #2 is a self-CFI, and a CFI of the CC #2 obtained from another CC (i.e., the CC #1 or the CC #3) is a cross-CFI.

Figure 6:
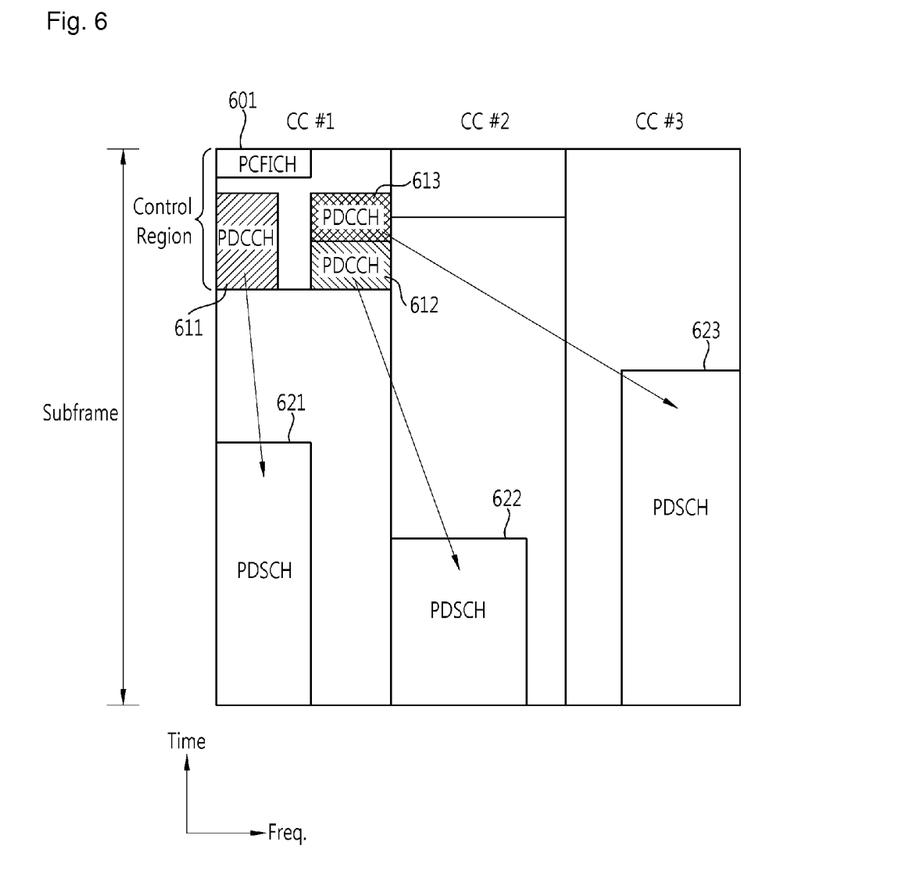
FIG. 6 shows an exemplary operation of a multiple carrier system.

FIG. 6 shows an exemplary operation of a multiple carrier system.

A UE can know a CFI of a CC #1 by using a PCFICH of the CC #1. Therefore, a PDCCH can be monitored in a control region. The UE can receive downlink data from a PDSCH 621 of the CC #1 by using a 1st PDCCH 611.

Since cross-carrier scheduling is possible, it is assumed that the 2nd PDCCH 612 indicates a PDSCH 622 of a CC #2 and a 3rd PDCCH 613 indicates a PDSCH 623 of a CC #3. It is also assumed that the CC #2 is allocated with its control region whereas no control region is allocated to the CC #3.

Similarly to the CC #1, the PCFICH may be allocated to the CC #2 and the CC #3, and the CFI may be reported to the UE. However, if the PCFICH is transmitted to the CC #3 which is not allocated with the control region or to all CCs, resource utilization may be ineffective. In addition, the conventional PCFICH structure is not much reliable since a transmission error cannot be detected in this structure.

Figure 7:
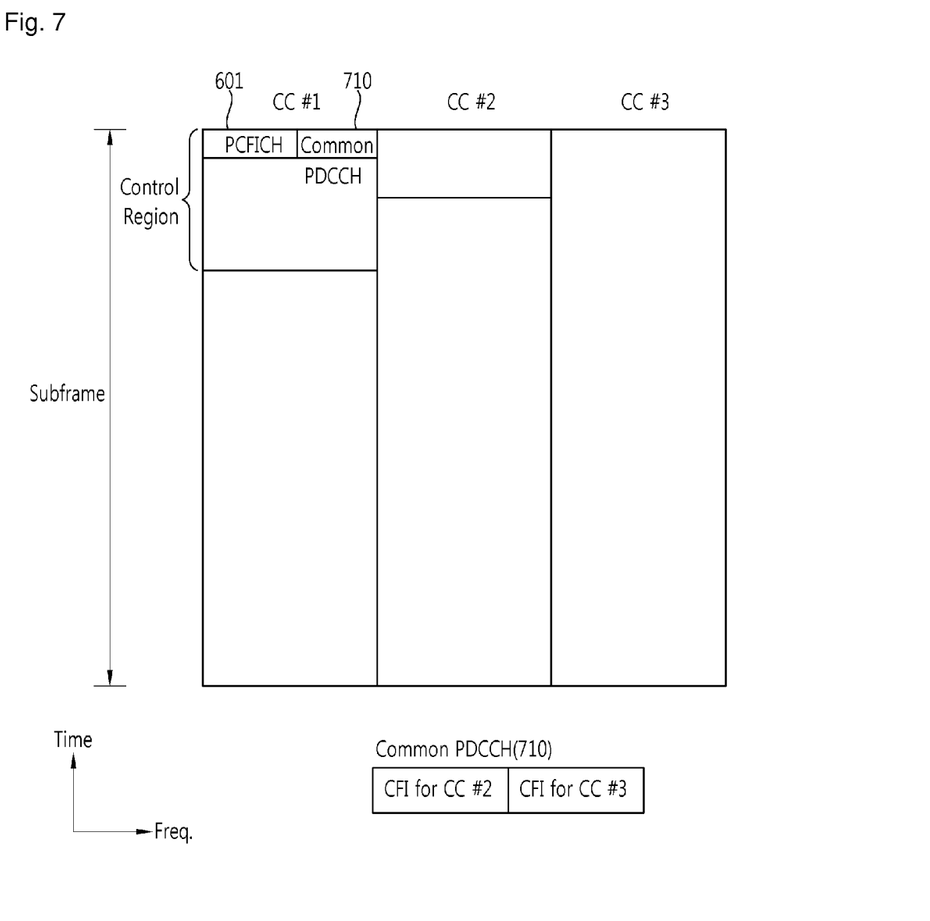
FIG. 7 shows a method of supporting multiple carriers according to an embodiment of the present invention.

FIG. 7 shows a method of supporting multiple carriers according to an embodiment of the present invention.

In a reference carrier, i.e., a CC #1, a self-CFI is transmitted through a PCFICH 601, and cross-CFIs, i.e., a CFI for a CC #2 and a CFI for a CC #3, are transmitted through a common PDCCH 710.

The common PDCCH 710 may be monitored using blind decoding similarly to the conventional PDCCH. A new DCI format may be defined for the common PDCCH 710. To perform blind decoding, a UE has to know a size of a control region. Therefore, the UE may first receive the self-CFI through the PCFICH 601 and then receive the common PDCCH 710.

A unique ID of the UE (e.g., C-RNTI) may be CRC-masked to the common PDCCH 710. Alternatively, a unique ID may be defined for CRC-masking of the common PDCCH 710. The unique ID may be cell-specific or UE group-specific.

The common PDCCH 710 may be allocated to a fixed resource in a subframe without using blind decoding. For example, among available CCEs, a last CCE or a first CCE may be used for transmission of the common PDCCH 710.

Alternatively, the common PDCCH 710 may be transmitted using an unmapped REG or an unmapped RE.

In the 3GPP LTE system, if one OFDM symbol includes a reference signal (RS), available REs are present in a multiple of 4. A PCFICH uses 4 REGs (=16 REs). A PHICH uses REGs in a multiple of 3 (or a multiple of 12 in case of the RE) according to the number of PHICH groups. In case of a PDCCH, at least one CCE is used as a basic unit. 1 CCE is 9 REGs (=36 REs). With such combinations, an REG not used for any one of the RS, the PCFICH, the PHICH, and the PDCCH may exist in a control region according to the number of all RBs in a system and the number of OFDM symbols indicated by the PCFICH. Such an REG is referred to as an unmapped REG.

It is assumed herein that the number Nrb of all RBs in the system is 6, 25, 50, and 100, four transmit antennas are used, a normal CP is used, and the PHICH is configured to ⅙ of the number of all RBs.

Table 1 shows the number of REs for the RS, the PCFICH, and the PHICH in the control region.

TABLE 1

| Nrb | (1) RE depending on the number of OFDM symbols | | | | (2) RE for RS | | | | (3) RE for PCFICH | (4) RE for PHICH |
|---|---|---|---|---|---|---|---|---|---|---|
| | 1 | 2 | 3 | 4 | 1 | 2 | 3 | 4 | 1~4 | 1~4 |
| 6 | | 144 | 216 | 288 | | 48 | 48 | 48 | 16 | 12 |
| 25 | 300 | 600 | 900 | | 100 | 200 | 200 | | 16 | 12 |
| 50 | 600 | 1200 | 1800 | | 200 | 400 | 400 | | 16 | 24 |
| 100 | 1200 | 2400 | 3600 | | 400 | 800 | 800 | | 16 | 36 |

Table 2 shows the number of unmapped REGs depending on the number of OFDM symbols for the control region.

TABLE 2

| Nrb | Available REs for PDCCH(5) = (2) − (3) − (4) | | | | Available CCEs for PDCCH(6) = floor[(5)/36] | | | | Unmapped REGs(7) = (5) − (6) * 36 | | | |
|---|---|---|---|---|---|---|---|---|---|---|---|---|
| | 1 | 2 | 3 | 4 | 1 | 2 | 3 | 4 | 1 | 2 | 3 | 4 |
| 6 | | 66 | 140 | 212 | | 1 | 3 | 5 | | 8 | 8 | 8 |
| 25 | 172 | 372 | 672 | | 4 | 10 | 18 | | 7 | 3 | 6 | |
| 50 | 360 | 760 | 1360 | | 10 | 21 | 37 | | 0 | 1 | 7 | |
| 100 | 748 | 1548 | 2748 | | 20 | 43 | 76 | | 7 | 0 | 3 | |

Accordingly, if an unmapped REG exists, the unmapped REG may be preferentially used for transmission of a cross-CFI. If the unmapped REG is insufficient, an REG dedicated for the use of a CCE may be used instead. More specifically, the following method may be used.

For one example, the number $N_{REG}$ of REGs necessary for transmission of one cross-CFI is determined. Among unmapped REGs, some REGs corresponding to a multiple of the number NREG are used to transmit the cross-CFI. For example, if $N_{REG}=4$, when the number of unmapped REGs is less than or equal to 3, the unmapped REGs are not used, and when the number of unmapped REGs is 4 to 7, one cross-CFI is transmitted using four unmapped REGs. When the number Nn of unmapped REGs is 8, two cross-CFIs are transmitted using 8 unmapped REGs.

Since the cross-CFI can be transmitted with a constant code rate, encoding/decoding can be simply implemented.

For another example, up to floor($Nn/N_{REG}$) cross-CFIs can be transmitted for unmapped REGs. That is, a code rate changes according to the number Nn of unmapped REGs and the number of cross-CFIs to be transmitted. For example, if $N_{REG}=4$, when the number Nn of unmapped REGs is less than or equal to 3, the unmapped REGs are not used, and when the number Nn of unmapped REGs is 4 to 7, a code rate of one cross-CFI is used by changing the code rate to be suitable for 4 to 7 REGs. When the number Nn of unmapped REGs is 8, a code rate of two cross-CFIs is used by changing the code rate to be suitable for 8 unmapped REGs.

Since the cross-CFI can be transmitted with a minimum code rate according to available resources, an error rate can be minimized.

If the unmapped REG is not enough to transmit the cross-CFI, an REG dedicated for the use of a CCE may be used instead. In this case, since one CCE is 9 REGs, one cross-CFI may be used in a unit of $N_{REG}$ with a constant code rate, or a code rate may be used by changing the code rate to be suitable for an available CCE within a maximum code rate and/or a minimum code rate.

The common PDCCH 710 for the cross-CFI is configured in a physical layer, but the present invention is not limited thereto, and thus it may also be configured in a higher layer. For example, the cross-CFI may be included in a higher layer message such as a radio resource control (RRC) message.

Figure 8:
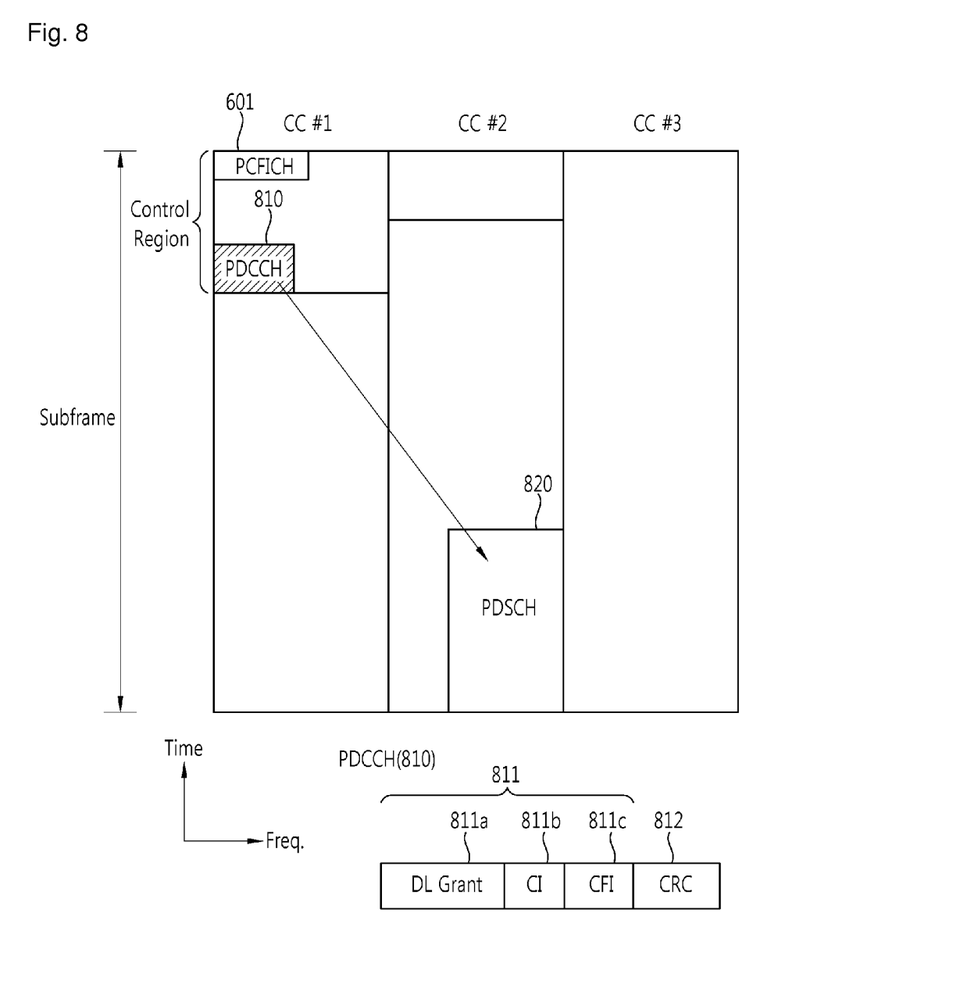
FIG. 8 shows a method of supporting multiple carriers according to an embodiment of the present invention.

FIG. 8 shows a method of supporting multiple carriers according to an embodiment of the present invention.

In a reference carrier, i.e., a CC #1, a self-CFI is transmitted through a PCFICH 601. Further, not only a downlink grant 811*a* but also a carrier indicator (CI) 811*b* which is an index of a CC using the downlink grant 811*a* and a CFI 811*c* of a CC indicated by the CI 811*b* are transmitted through a PDCCH 810.

A DCI 811 of the PDCCH 810 includes the downlink grant 811*a*, the CI 811*b*, and the CFI 811*c*. A CRC 812 is attached to the DCI 811. The downlink grant 811*a* includes resource allocation of a PDSCH 820 of a CC #2. The CI 811*b* indicates an index of the CC #2. The CFI 811*c* indicates a CFI of the CC #2.

Since the DCI 811 of the PDCCH 810 includes the CI 811*b* and the CFI 811*c*, the PDCCH 810 may be defined with a new DCI format.

In the DCI 811 of the PDCCH 810, the downlink grant 811*a* may indicate a PDSCH of the reference carrier. This implies that the DCI 811 of the PDCCH 810 may be used for not only cross-carrier scheduling but also the same self-carrier scheduling as the conventional PDCCH. The reason above is to reduce an overload of blind decoding by decreasing the number of available DCI formats. In this case, the CFI 811*c* included in the DCI 811 of the PDCCH 810 may have a NULL value. Alternatively, the CFI 811*c* may include not the cross-CFI but the self-CFI. If a self-CFI is included in the DCI 811 of the PDCCH 810, it may overlap with the self-CFI of the PCFICH 601. An analysis for a case where the two self-CFIs have different values or where an error occurs in a certain channel will be described below.

Figure 9:
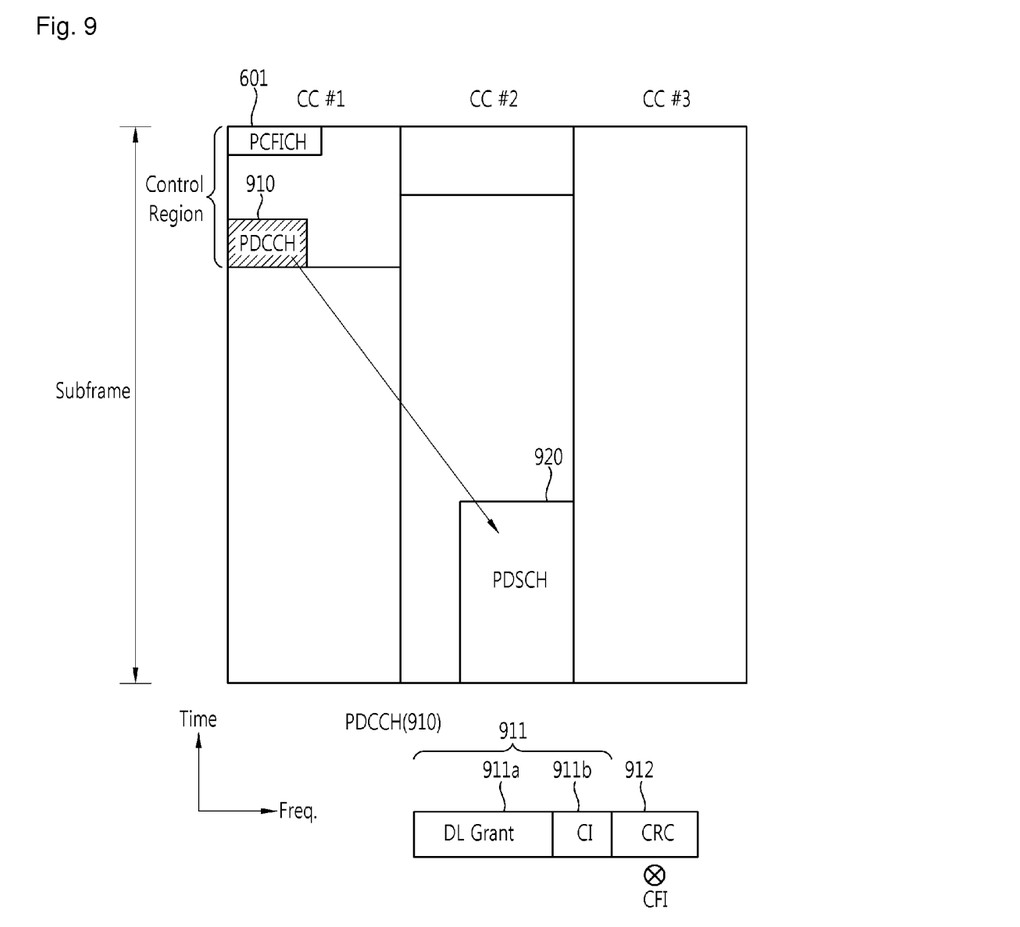
FIG. 9 shows a method of supporting multiple carriers according to an embodiment of the present invention.

FIG. 9 shows a method of supporting multiple carriers according to an embodiment of the present invention.

In a reference carrier, i.e., a CC #1, a self-CFI is transmitted through a PCFICH 601. Further, not only a downlink grant 911*a* but also a carrier indicator (CI) 911*b* which is an index of a CC using the downlink grant 911*a* and a CFI of a CC indicated by the CI 911*b* are transmitted through a PDCCH 910.

Unlike in the embodiment of FIG. 8, a DCI 911 of the PDCCH 910 includes the downlink grant 911*a* and the CI 911*b*. The CFI is masked to a CRC 912 of the DCI 911. The downlink grant 911*a* includes resource allocation of a PDSCH 920 of a CC #2. The CI 911*b* indicates an index of the CC #2. A CFI of the CC #2 is masked to the CRC of the DCI 911.

Meanwhile, a state field indicating whether a cross-CFI is received may be reported by a BS to a UE by using higher layer signaling.

The state field is a field indicating whether the cross-CFI is transmitted and/or whether a PCFICH is transmitted. The state field may be set for each CC or may be set to one flag for all CCs. The UE first receives the state field to determine whether the PCFICH needs to be received for each CC. If the PCFICH is not provided to each CC, the UE may determine the cross-CFI according to at least one of the embodiments of FIG. 7 to FIG. 9. Alternatively, if the PCFICH is not provided, the UE may define a specific value as a CFI of a specific CC.

Figure 10:
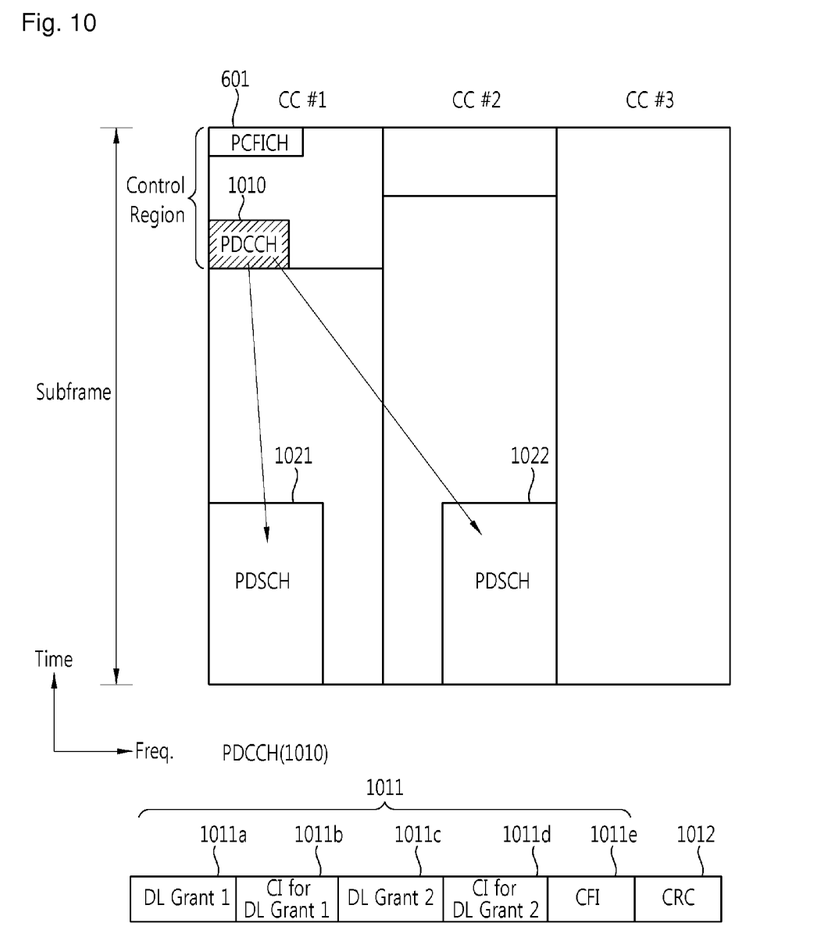
FIG. 10 shows a method of supporting multiple carriers according to an embodiment of the present invention.

FIG. 10 shows a method of supporting multiple carriers according to an embodiment of the present invention. Joint coding in which a plurality of downlink grants are included in one PDCCH 101 is used in this method.

In a reference carrier, i.e., a CC #1, a self-CFI is transmitted through a PCFICH 601, and a DCI 1011 is transmitted through the PDCCH 1010. The DCI 1011 includes a downlink grant 1 1011*a* for a PDSCH 1021 of the CC #1, a CI 1011*b* for which the downlink grant 1 1011*a* is used, a downlink grant 2 1011*c* for a PDSCH 1022 of a CC #2, a CI 1011*d* for which the downlink grant 2 1011*c* is used, and a CFI 1011*e* including a cross-CFI. Since the self-CFI is transmitted through the PCFICH 601, the self-CFI is not included in the DCI 1011.

For another example, the DCI 1011 may further include the self-CFI, or may further include a NULL bit corresponding to the CFI 1011*e*. When a bit length of DCI including a downlink grant (also referred to as a self-downlink grant, e.g., the downlink 1 1011*a* in FIG. 10) of the reference carrier differs from a bit length of DCI not including the downlink grant of the reference carrier, the number of blind decoding attempts may increase. To equate a bit length between a PDCCH carrying scheduling information of the reference carrier and a PDCCH not carrying the scheduling information of the reference carrier, the DCI 1011 may include the self-CFI or the NULL bit.

Figure 11:
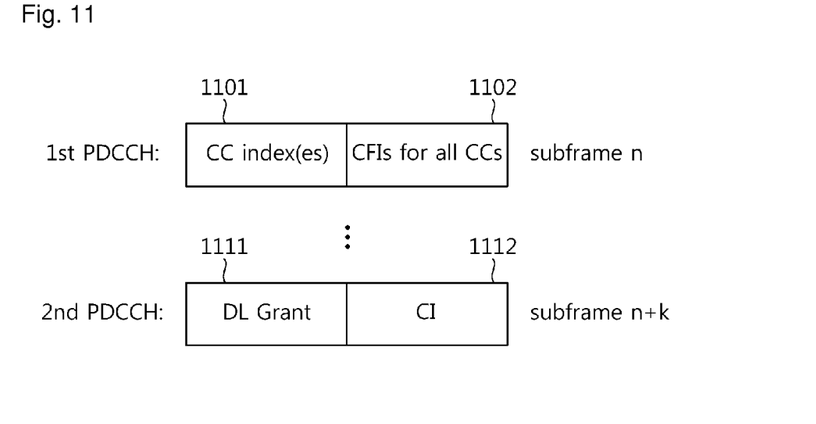
FIG. 11 shows a method of supporting multiple carriers according to an embodiment of the present invention.

FIG. 11 shows a method of supporting multiple carriers according to an embodiment of the present invention. A 1st PDCCH is transmitted in a subframe n, and a 2nd PDCCH is transmitted in a subframe n+k (k>0).

The 1st PDCCH carries a CC index 1101 of CCs used by a UE to monitor the PDCCH and/or a CFI 1102 of a CC to be monitored in the subframe n+k.

The 2nd PDCCH carries a downlink grant 1111 and a CI 1112 of a CC for which the downlink grant 1111 is used.

The 1st PDCCH and the 2nd PDCCH may be transmitted using the same CC or different CCs.

A probability that the UE is scheduled throughout all CCs in every subframe is not high. Therefore, the 1st PDCCH reports a CC to be monitored by the UE, and the 2nd PDCCH reports scheduling information to be used by the UE.

Figure 12:
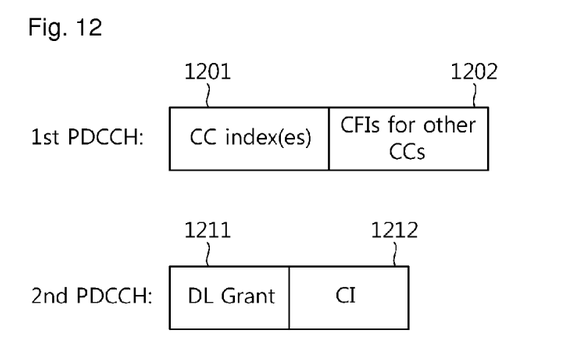
FIG. 12 shows a method of supporting multiple carriers according to an embodiment of the present invention.

FIG. 12 shows a method of supporting multiple carriers according to an embodiment of the present invention. In comparison with the embodiment of FIG. 11, a 1st PDCCH and a 2nd PDCCH are transmitted in the same subframe (k=0).

The 1st PDCCH carries a CC index 1201 of CCs used by a UE to monitor the PDCCH and/or a CFI 1202 of other CCs. The CFI 1202 includes a cross-CFI, and may further include a self-CFI.

The 2nd PDCCH carries a downlink grant 1211 and a CI 1212 of a CC for which the downlink grant 1211 is used.

Since the self-CFI has already been detected through a PCFICH, a cross-CFI is transmitted through the 1st PDCCH.

In the embodiments of FIG. 11 and FIG. 12, the 1st PDCCH can carry a CC index of CCs used by the UE to monitor the PDCCH in the absence of the CFI. In this case, the 2nd PDCCH can carry the CFI by being implemented in the PDCCH structure shown in the embodiments of FIG. 8 to FIG. 10.

Now, an analysis between a CFI obtained through a PDCCH of other CCs (this CFI is a cross-CFI) and a CFI directly obtained through a PCFICH (this CFI is a self-CFI) will be described.

For example, a UE using a CC #2 obtains a cross-CFI of the CC #2 through a PDCCH of a CC #1, and obtains a self-CFI of the CC #2 through a PCFICH of the CC #2.

If the two values are equal to each other, the value may be directly used. However, if a channel error occurs, there is a need to determine which information will be used.

First, when decoding of a cross-CFI is unsuccessful (e.g., a CRC error occurs in a PDCCH carrying the cross-CFI), the UE uses a self-CFI obtained through a PCFICH.

Second, when decoding of the cross-CFI is successful, the UE uses the cross-CFI irrespective of a CFI of the PCFICH. This is to give a higher priority than a cross-CFI capable of detecting a decoding error using CRC or the like.

Figure 13:
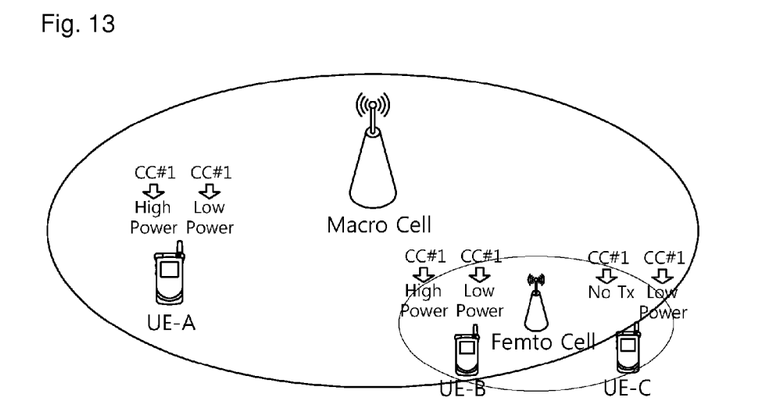
FIG. 13 shows a cell deployment in which a macro cell and a femto cell coexist.

FIG. 13 shows a cell deployment in which a macro cell and a femto cell coexist. It is assumed that the macro cell uses a CC #1 and a CC #2 and the femto cell uses only the CC #2. A UE-A and a UE-B are macro UEs receiving a service from the macro cell. A UE-C is a femto UE receiving a service from the femto cell.

When the macro cell and the femto cell coexist, there is a need to regulate control channel interference between the two cells. In the macro cell, transmit power of the CC #1 is set to a great value and transmit power of the CC #2 is set to a small value so as to mitigate interference acting on the CC #2 used by the femto cell. On the other hand, in the femto cell, transmit power of the CC #2 is set to a small value so as to decrease interference acting on the CC #1 and the CC #2 of the macro cell.

A magnitude of interference from the CC #2 used by the femto cell varies according to a location of the UE in the macro cell. A macro UE located near the femto cell, i.e., the UE-B, is more severally interfered with the CC #2 used by the femto cell than a macro UE located far from the femto cell, i.e., the UE-A. When the CC #2 is used for control channel transmission of the macro cell, a control channel error rate varies between the UE-A and the UE-B due to the interference. This implies that a reception success rate of a PDCCH and a PCFICH may vary between the UE-A and the UE-B.

If the PCFICH exists, a BS may report to the UE a discard field indicating whether a self-CFI over the PCFICH will be utilized or discarded. The discard field may indicate whether the UE will obtain a self-CFI obtained through the PCFICH of each CC or a cross-CFI received from other CCs. The discard field may be transmitted from the BS to the UE by using system information and/or a higher layer message.

For example, regarding the UE-A, a priority may be given to the self-CFI of the PCFICH since the UE-A is not severally interfered with the CC #2 used by the femto cell. Further, regarding the UE-B, a priority may be given to the cross-CFI capable of detecting a CRC error since the UE-B is severally interfered with the CC #2 used by the femto cell.

Figure 14:
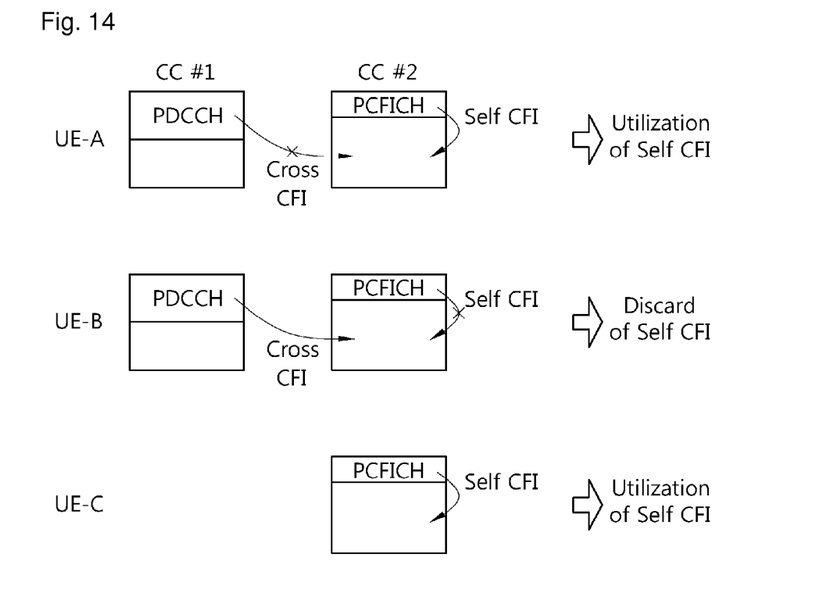
FIG. 14 shows an example of utilizing a discard field.

FIG. 14 shows an example of utilizing a discard field. A UE-A is configured to utilize a self-CFI due to weak interference. A UE-B is configured to discard a self-CFI due to strong interference.

The UE-A utilizes a self-CFI obtained through a PCFICH irrespective of whether decoding of a cross-CFI is successful or not.

The UE-B discards a self-CFI. If a cross-CFI is successfully received, the UE-B uses the cross-CFI. If the cross-CRI is unsuccessfully received, the UE-B may not attempt to receive a PDCCH of a specific CC or may use all possible CFI combinations. If a PDCCH is unsuccessfully received even though all combinations are used, an HARQ buffer received in a specific subframe is discarded since an error may occur when the HARQ buffer is combined with a previously received buffer.

Now, PHICH configuration depending on a CFI value will be described.

In the 3GPP LTE system, a PCFICH exists in a 1st OFDM symbol of a subframe and the CFI value is selected from one of values 1, 2, and 3, and thus a control region ensures at least one OFDM symbol. However, it is also possible to consider a CC not having the control region (i.e., not having a PDCCH) in multiple carriers. This implies that there is a case where the CFI value is '0'. In this case, a mechanism of analyzing a PHICH resource is an issue to be considered.

First, if the PCFICH exists and an obtained self-CFI value is 0, it is analyzed that the PHICH does not exist.

Second, if a cross-CFI is obtained in the absence of the PCFICH and the obtained cross-CFI value is 0, it is analyzed that the PHICH does not exist.

Third, if a self-CFI and a cross-CFI are obtained together over the PCFICH, a CFI is determined according to a priority shown in the embodiment of FIG. 14. If the obtained CFI value is 0, it is analyzed that the PHICH does not exist.

Meanwhile, in the 3GPP LTE system, the PCFICH and the PDCCH exist in a control region, and the PDSCH exists in a data region. The PCFICH is transmitted in a 1st OFDM symbol of the control region.

Among multiple carriers, a CC having only the PCFICH without the PDCCH may be defined. In this case, the PCFICH does not entirely occupy the 1st OFDM symbol, and thus a subcarrier not used by the PCFICH in the 1st OFDM symbol may be utilized in PDSCH transmission. However, since an RB is not taken into account when the PCFICH is deployed in frequency domain, the number of REs used in the PCFICH may vary depending on the position of the RB in frequency domain. That is, the number of REs at the RB used for PCFICH transmission by a UE varies depending on the number and position of RBs used for PDSCH transmission by the UE. Therefore, a UE recognizes the number of actually available REs by considering the PCFICH for each RB, and thus can perform rate matching such that PDSCH data is not mapped to an RE used as the PCFICH.

Figure 15:
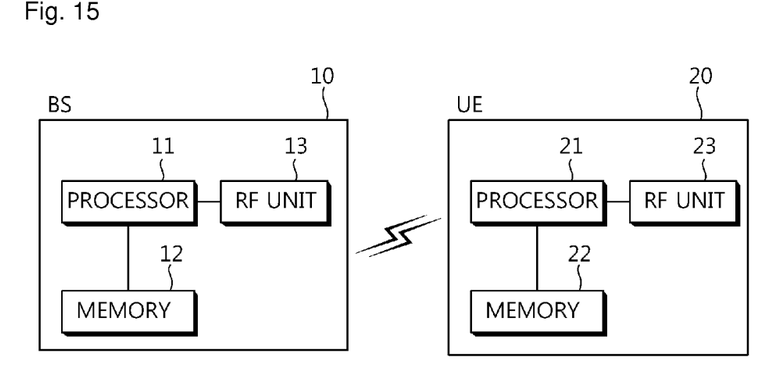
FIG. 15 is a block diagram showing a wireless communication system for implementing an embodiment of the present invention.

FIG. 15 is a block diagram showing a wireless communication system for implementing an embodiment of the present invention.

A BS 10 includes a processor 11, a memory 12, and a radio frequency (RF) unit 13.

The processor 11 implements the proposed functions, processes, and/or methods. The aforementioned operation of the BS 10 may be implemented by the processor 11. The processor 11 may support a multiple-carrier operation, and may configure a downlink physical channel.

The memory 12 is coupled to the processor 11, and stores a protocol or parameter for the multiple-carrier operation. The RF unit 13 is coupled to the processor 11, and transmits and/or receives a radio signal.

A UE 20 includes a processor 21, a memory 22, and an RF unit 23.

The processor 21 implements the proposed functions, processes, and/or methods. The aforementioned operation of the UE 20 may be implemented by the processor 21. The processor 21 may support a multiple-carrier operation, and may monitor a PDCCH by using an obtained CFI.

The memory 22 is coupled to the processor 21, and stores a protocol or parameter for the multiple-carrier operation. The RF unit 23 is coupled to the processor 21, and transmits and/or receives a radio signal.

The processors 11, 21 may include application-specific integrated circuit (ASIC), other chipset, logic circuit and/or data processing device. The memories 12, 22 may include read-only memory (ROM), random access memory (RAM), flash memory, memory card, storage medium and/or other storage device. The RF units 13, 23 may include baseband circuitry to process radio frequency signals. When the embodiments are implemented in software, the techniques described herein can be implemented with modules (e.g., procedures, functions, and so on) that perform the functions described herein. The modules can be stored in memories 12, 22 and executed by processors 11, 21. The memories 12, 22 can be implemented within the processors 11, 21 or external to the processors 11, 21 in which case those can be communicatively coupled to the processors 11, 21 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of monitoring a control channel in a multiple carrier system, the method performed by a user equipment (UE) and comprising:
receiving, by the UE, a first control format indicator (CFI) indicating a size of a control region of a first component carrier via the first component carrier;
receiving, by the UE, downlink control information (DCI) comprising a cross-CFI indicating a size of a control region of a second component carrier being different than the first component carrier over a first downlink control channel in the control region of the first component carrier;
receiving, by the UE via the second component carrier, a second CFI indicating the size of the control region of the second component carrier;
receiving, by the UE, a higher layer signal including information on whether to use or discard the second CFI which is received via the second component carrier;
determining whether to use the cross-CFI or the second CFI based on the higher layer signal;
if the cross-CFI is determined to be used, monitoring, at the UE, a second downlink control channel in the control region of the second component carrier using the cross-CFI and discarding the second CFI; and
if the second-CFI is determined to be used, monitoring, at the UE, a second downlink control channel in the control region of the second component carrier using at least the second-CFI.

2. The method of claim 1, wherein the DCI comprises a plurality of cross-CFIs for a plurality of carriers.

3. The method of claim 1, wherein the DCI further comprises a carrier indicator (CI) indicating an index of the second component carrier.

4. The method of claim 3, wherein the DCI further comprises a downlink grant for resource allocation of a downlink data channel in a data region of the second component carrier.

5. The method of claim 1, wherein the cross-CFI is masked to a cyclic redundancy check (CRC) of the DCI.

6. A user equipment supporting multiple carriers, comprising:
a radio frequency (RF) unit for transmitting and receiving a radio signal; and
a processor coupled to the RF unit, wherein the processor is configured to:
receive a first control format indicator (CFI) indicating a size of a control region of a first component carrier via the first component carrier,
receive downlink control information (DCI) comprising a cross-CFI indicating a size of a control region of a second component carrier being different than the first component carrier over a first downlink control channel in the control region of the first component carrier,
receive, via the second component carrier, a second CFI indicating the size of the control region of the second component carrier,
receive a higher layer signal including information on whether to use or discard the second CFI which is received via the second component carrier,
determine whether to use the cross-CFI or the second CFI based on the higher layer signal,
if the cross-CFI is determined to be used, monitor a second downlink control channel in the control region of the second component carrier using the cross-CFI and discard the second CFI; and
if the second-CFI is determined to be used, monitor a second downlink control channel in the control region of the second component carrier using at least the second-CFI.

7. The user equipment of claim 6, wherein the DCI further comprises a carrier indicator (CI) indicating an index of the second component carrier.

8. The user equipment of claim 7, wherein the DCI further comprises a downlink grant for resource allocation of a downlink data channel in a data region of the second component carrier.

* * * * *